United States Patent
Lee et al.

(10) Patent No.: US 9,769,185 B2
(45) Date of Patent: Sep. 19, 2017

(54) METHOD AND SYSTEM FOR MANAGING SUSPICIOUS DEVICES ON NETWORK

(75) Inventors: Sung-woo Lee, Seoul (KR); Ji-yeon Han, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 74 days.

(21) Appl. No.: 13/605,383

(22) Filed: Sep. 6, 2012

(65) Prior Publication Data

US 2013/0067571 A1 Mar. 14, 2013

(30) Foreign Application Priority Data

Sep. 8, 2011 (KR) .................. 10-2011-0091417

(51) Int. Cl.
*H04L 29/06* (2006.01)
*H04L 12/24* (2006.01)

(52) U.S. Cl.
CPC ...... *H04L 63/1416* (2013.01); *H04L 41/0681* (2013.01); *H04L 41/0893* (2013.01); *H04L 41/22* (2013.01)

(58) Field of Classification Search
CPC .... G06F 3/1229; G06F 3/1234; G06F 1/1235; G06F 3/1232; G06F 11/00; G06F 11/07; G06F 11/0766; G06F 11/0775; G06F 11/0793
See application file for complete search history.

(56) References Cited

U.S. PATENT DOCUMENTS

| | | | |
|---|---|---|---|
| 2006/0129658 A1* | 6/2006 | Kawai | H04L 41/082 709/220 |
| 2007/0050750 A1* | 3/2007 | Bykov | G06F 8/61 717/100 |
| 2008/0082657 A1* | 4/2008 | Hart | H04L 41/0893 709/224 |
| 2009/0037336 A1* | 2/2009 | Sunata | G06F 21/105 705/59 |

(Continued)

FOREIGN PATENT DOCUMENTS

JP 2001-350617 A 12/2001

OTHER PUBLICATIONS

European Search Report dated Dec. 5, 2012 in corresponding European Patent Application 12183388.6.

(Continued)

*Primary Examiner* — Harunur Rashid
*Assistant Examiner* — Quy Pham
(74) *Attorney, Agent, or Firm* — Staas & Halsey LLP

(57) ABSTRACT

A method and system for managing suspicious devices on a network. The method includes, setting based on a manager's input or selection a suspicious group corresponding to each of at least one suspicious management item for managing a plurality of devices on a network via a user interface; accessing the devices and reading information corresponding to the suspicious management item; determining whether each device is a suspicious device based on the information corresponding to the suspicious management (Continued)

item, and registering the device in the suspicious group if the device is determined as a suspicious device; checking whether an error of the device comprised in the suspicious group is resolved; and eliminating the device from the suspicious group if the error of the device is resolved.

19 Claims, 9 Drawing Sheets

(56) References Cited

U.S. PATENT DOCUMENTS

| | | | |
|---|---|---|---|
| 2009/0038014 A1 | 2/2009 | Force | |
| 2009/0182794 A1 | 7/2009 | Sekiguchi | |
| 2010/0033586 A1 | 2/2010 | Kim | |
| 2011/0150507 A1* | 6/2011 | Kim | G03G 15/55 399/31 |
| 2011/0172961 A1* | 7/2011 | Sunata | G06F 11/0733 702/179 |
| 2011/0317218 A1* | 12/2011 | Zhang | H04N 1/00244 358/1.15 |
| 2012/0036220 A1* | 2/2012 | Dare | G06F 8/61 709/217 |

OTHER PUBLICATIONS

Non-Final Office Action issued Aug. 1, 2017 in corresponding Korean Patent Application No. 10-2011-0091417 (5 pages) (5 pages English Translation).

* cited by examiner

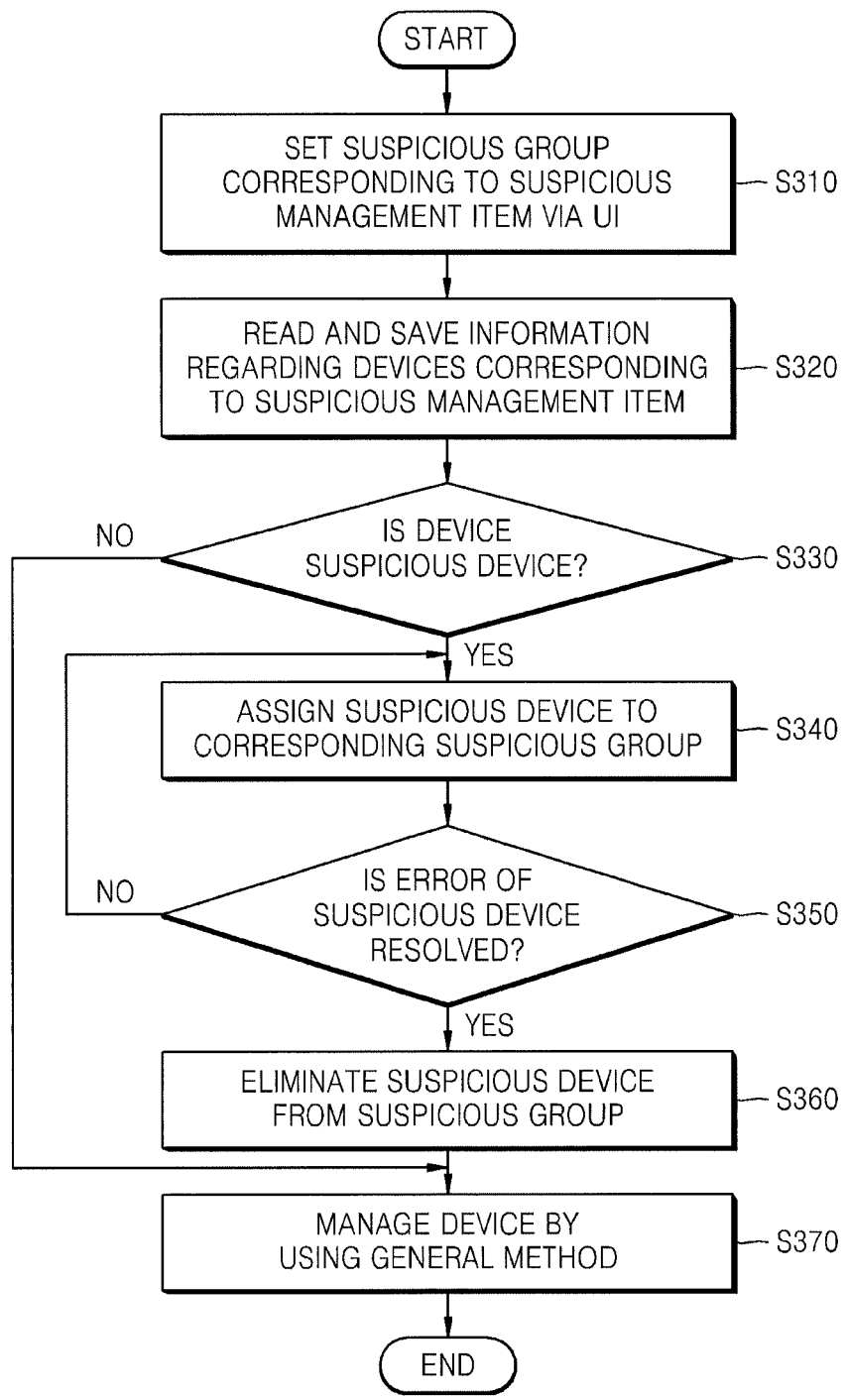

FIG. 4

| | 2nd Floor (Selected 0 / Total 500) | | Error: 25 Warning: 5 New: 8 | | | |
|---|---|---|---|---|---|---|
| | ○ Configuration | ○ Initialize Discovery | | ○ Firmware Update | | Driver Installation |
| | [Connection Settings] ☐ Display devices from subgroups | | | All ▼ | | Search 🔍 |
| | Type | Status | Toner | Model Name | IP Address | Serial No. | MAC Address |
| ☐ | Network | Normal | K100 C100 M25 Y7 | CLX 8145 | 13.125.125.122 | 12685545684 | 00:00:AA:B9:00:A4 |
| ☐ | Network | Normal | K100 C100 M25 Y7 | CLX 8145 | 13.125.125.122 | 12685545684 | 00:00:AA:B9:00:A4 |

▼ ◀Previous 1 2 3 4 5 6 7 8 9 10 Next▶ ▲▲ List 20 ▶

Device Group ⟲ ❓
▼ All Devices [120/100/300]
  ▲ Ungrouped [10/20/100]
▼ Grouped [120/10/200]
  ▲ City Bank [12/20/50]
  ▲ Chase [20/15/50]
▼ Central Bank [30/25/100]
  ▲ Boston [20/12/50]
  ▲ New York [20/23/50]
⊞ ⊟

Dynamic Group ⟲ ❓
▲ Model Group [12/23/50]
▲ Color/Mono Group [20/12/50]
▲ On/Off Group [20/12/50]
▲ Suspicious Devices [20/1/50]
▲ Custom Group [20/12/50]
⊞ ⊟

| | Type | Status | Toner | Model Name | IP Address | Org Serial No. | Current Serial No. |
|---|---|---|---|---|---|---|---|
| □ | Network | Normal | K100 C100 M25 Y7 | CLX 8145 | 13,125,125,122 | 12685545684 | 748954WE8 |
| □ | Network | Normal | K100 | ML-4550 | 10.88.184.141 | 1235489251 | 1357821AE |
| □ | Network | Error | K100 C65 M25 Y7 | SCX-6545X | 10.88.182.56 | 44898WE86 | 12QWE682 |
| □ | Network | Normal | K26 C100 M25 Y7 | SCX-6x55X | 10.88.181.220 | 156884WE2 | 5786WRY85 |
| □ | Network | Error | K100 C100 M Y7 | CLX8380 | 10.88.184.126 | 4868WE357 | 45WE56822 |
| □ | Network | Warning | K5 | ML-2150 | 10.88.183.25 | 453WER548 | 4872WGT52 |
| □ | Network | Normal | K64 C100 M25 Y84 | CLX-8385 | 10.88.181.250 | 465874WER | 48628EG15 |
| □ | Network | Normal | K100 C76 M68 Y7 | CLP-670 | 10.88.184.51 | 486WE46858 | 486SDQW5 |
| □ | Network | Normal | K100 C24 M25 Y21 | CLP-702 | 10.88.183.243 | 4687WE5795 | 35SE692W4 |

2nd Floor (Selected 0 / Total 500) | Error : 25 | Warning : 5 | New : 8 | Export | Print ▼

○ Configuration   ○ Initialize Discovery   ○ Firmware Update   ○ Driver Installation Connection Settings   ☐ Display devices from subgroups   600   All ▼   Search 🔍 610

FIG. 7

| Status | Toner | Model Name | IP Address | Serial No. | Suspicious Info | Condition |
|---|---|---|---|---|---|---|
| Normal | K100 C100 M25 Y7 | CLX 8145 | 13,125,125,122 | 12685545684 | -100 | Progressing |
| Normal | K100 C100 M25 Y7 | CLX 8145 | 13,125,125,122 | 126855456 | -20 | Request |
| Normal | K100 C100 M25 Y7 | CLX 8145 | 13,125,125,122 | 12685545684 | -40 | Progressing |
| Normal | K100 C100 M25 Y7 | CLX 8145 | 13,125,125,122 | 12685545684 | -50 | Progressing |
| Normal | K100 C100 M25 Y7 | CLX 8145 | 13,125,125,122 | 12685545684 | -90 | Progressing |
| Normal | K100 C100 M25 Y7 | CLX 8145 | 13,125,125,122 | 12685545684 | -9 | Request |
| Normal | K100 C100 M25 Y7 | CLX 8145 | 13,125,125,122 | 12685545684 | -2 | Request |
| Normal | K100 C100 M25 Y7 | CLX 8145 | 13,125,125,122 | 12685545684 | -1 | Request |
| Normal | K100 C100 M25 Y7 | CLX 8145 | 13,125,125,122 | 12685545684 | -3 | Request |

2nd Floor (Selected 0 / Total 500)  Error : 25 | Warning : 5 | New : 8  Export | Print ▶

○ Configuration  ○ Initialize Discovery  ○ Firmware Update  ○ Driver Installation Connection Settings  □ Display devices from subgroups  All ▼  Search ◀ Previous  1 2 3 4 5 6 7 8 9 10  Next ▶   List 20

700 — Suspicious Info
720 — Progressing
710 — Request

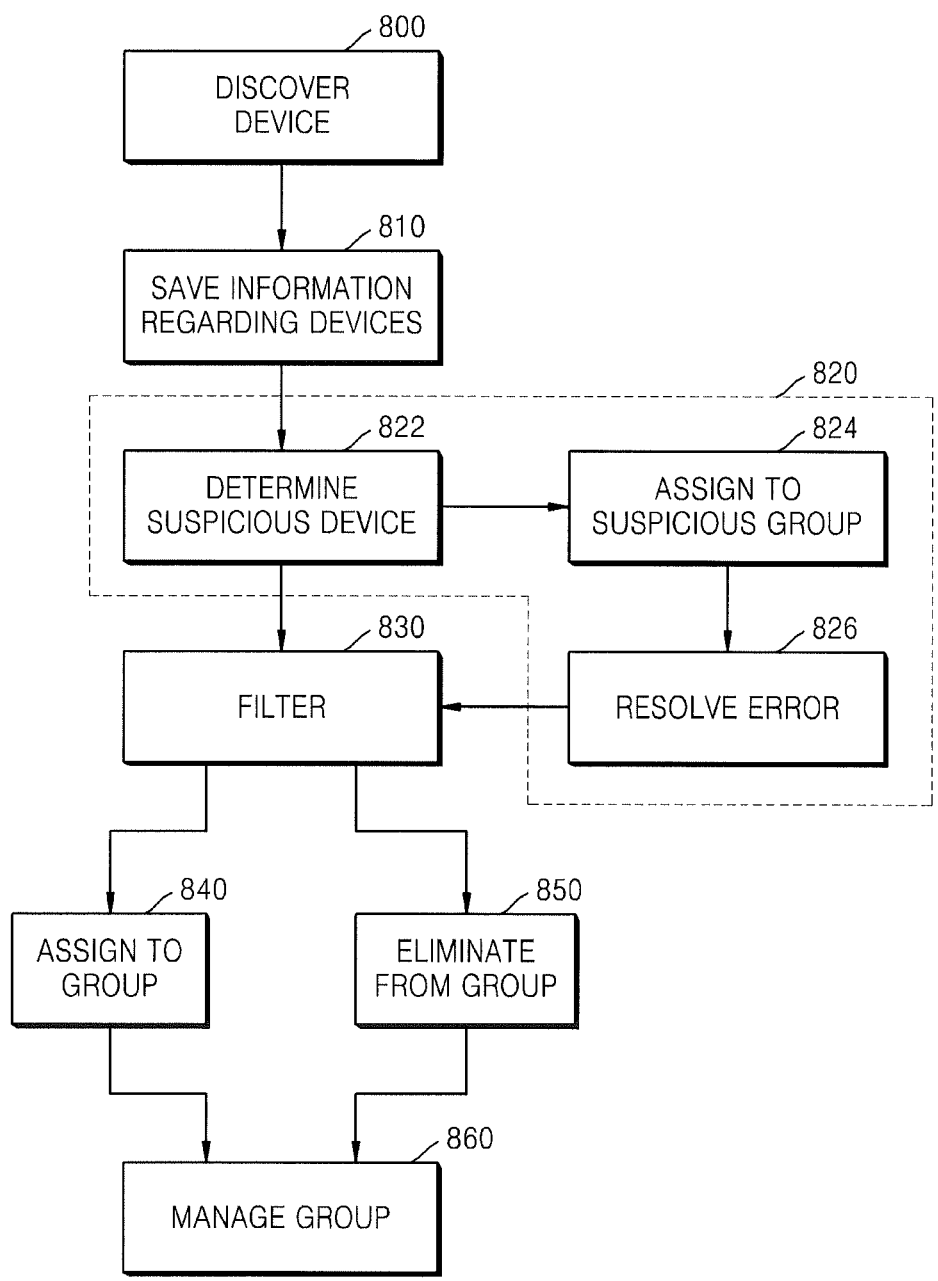

METHOD AND SYSTEM FOR MANAGING SUSPICIOUS DEVICES ON NETWORK

CROSS-REFERENCE TO RELATED APPLICATIONS

This application claims the priority benefit of Korean Patent Application number 10-2011-0091417, filed on Sep. 8, 2011, in the Korean Intellectual Property Office, the disclosure of which is incorporated herein in its entirety by reference.

BACKGROUND

1. Field

The present disclosure relates to device management, and more particularly, to a method and system for managing suspicious devices having abnormal management items on a network.

2. Description of the Related Art

Due to functional convenience, device management systems are provided in the form of solution systems and are used in various fields. A main goal of device management systems is to manage devices on a network by detecting and registering the devices and checking their status in real time.

However, since a large number of devices are used, the large number of devices have to be registered and thus may not be easily managed by using a list of all of the devices. Generally, in most cases, from among currently registered devices, only abnormal devices are managed.

In most current multifunction printer (MFP) solution systems, a user has to directly form a list of devices to manage the devices, or has to set a certain status to manage devices corresponding to the set status.

In the above management methods, if conditions of devices to be managed by a user are dynamically and frequently changed, the user may not easily set values of the devices which is done to group the devices. That is, if the statuses of devices are dynamically changed, a user has to recognize the changed statuses first and assigns the devices to preset management conditions, and then forms a list of devices based on the assignments. As such, the user may manage only certain devices by using preset values.

Since devices on a network are filtered and grouped based on values set by a user in a conventional device management method, even when a device undergoes a certain change or an essential modification, a dynamic function for automatically adding or eliminating the device from a group does not exist and the user has to manually and directly modify a group to which each device belongs with reference to status information of the device.

SUMMARY

Additional aspects and/or advantages will be set forth in part in the description which follows and, in part, will be apparent from the description, or may be learned by practice.

The present disclosure provides a method of managing suspicious devices on a network by determining whether a device is in an abnormal status and grouping abnormal devices into a suspicious group without a user's intervention.

The present disclosure also provides a system for managing suspicious devices on a network by determining whether a device is in an abnormal status and grouping abnormal devices into a suspicious group without a user's intervention.

According to an aspect of the present disclosure, there is provided a method of managing suspicious devices on a network, the method including, if a device to be managed and having a certain abnormal management item is referred to as a suspicious device and the certain abnormal management item is referred to as a suspicious management item, setting based on a manager's input or selection a suspicious group corresponding to each of at least one suspicious management item for managing a plurality of devices on a network, wherein the setting is performed by a user interface module; accessing the devices and reading information corresponding to the suspicious management item, wherein the accessing and the reading are performed by a device discovery module; determining whether each device is a suspicious device based on the information corresponding to the suspicious management item, and registering the device in the suspicious group if the device is determined as a suspicious device, wherein the determining and the registering are performed by a group registration/elimination module; checking whether an error of the device included in the suspicious group is resolved, wherein the checking is performed by the group registration/elimination module; and eliminating the device from the suspicious group if the error of the device is resolved, wherein the eliminating is performed by the group registration/elimination module.

According to another aspect of the present disclosure, there is provided a system for managing suspicious devices on a network, the system including a user interface module for, if a device to be managed and having a certain abnormal management item is referred to as a suspicious device and the certain abnormal management item is referred to as a suspicious management item, setting a suspicious group corresponding to each of at least one suspicious management item for managing a plurality of devices on a network; a device discovery module for accessing the devices and reading information corresponding to the suspicious management item; and a group registration/elimination module for determining whether each device is a suspicious device based on the information corresponding to the suspicious management item, registering the device in the suspicious group if the device is determined as a suspicious device, checking whether an error of the device included in the suspicious group is resolved, and eliminating the device from the suspicious group if the error of the device is resolved.

According to another aspect of one or more embodiments, there is provided at least one non-transitory computer readable medium storing computer readable instructions to implement methods of one or more embodiments.

BRIEF DESCRIPTION OF THE DRAWINGS

The above and other features and advantages of the present disclosure will become more apparent by describing in detail exemplary embodiments thereof with reference to the attached drawings in which:

FIG. 3 is a flowchart of a method of managing suspicious devices on a network, according to an embodiment of the present disclosure;

FIG. 4 is a diagram showing an example of a menu of a suspicious group;

FIG. 6 is a diagram showing a main screen displayed when a user selects an invalid serial number group that is one of subgroups;

FIG. 7 is a diagram showing a main screen displayed when a user recognizes and processes suspicious devices of a negative count group;

FIG. 8 is a flowchart of overall device management on a network, to which the present disclosure is applied.

DETAILED DESCRIPTION

Hereinafter, the present disclosure will be described in detail by explaining embodiments with reference to the attached drawings. It should be understood, however, that there is no intent to limit exemplary embodiments to the particular forms disclosed, but conversely, exemplary embodiments are to cover all modifications, equivalents, and alternatives falling within the spirit and scope of the invention.

As used herein, expressions such as "at least one of," when preceding a list of elements, modify the entire list of elements and do not modify the individual elements of the list.

Figure 1:
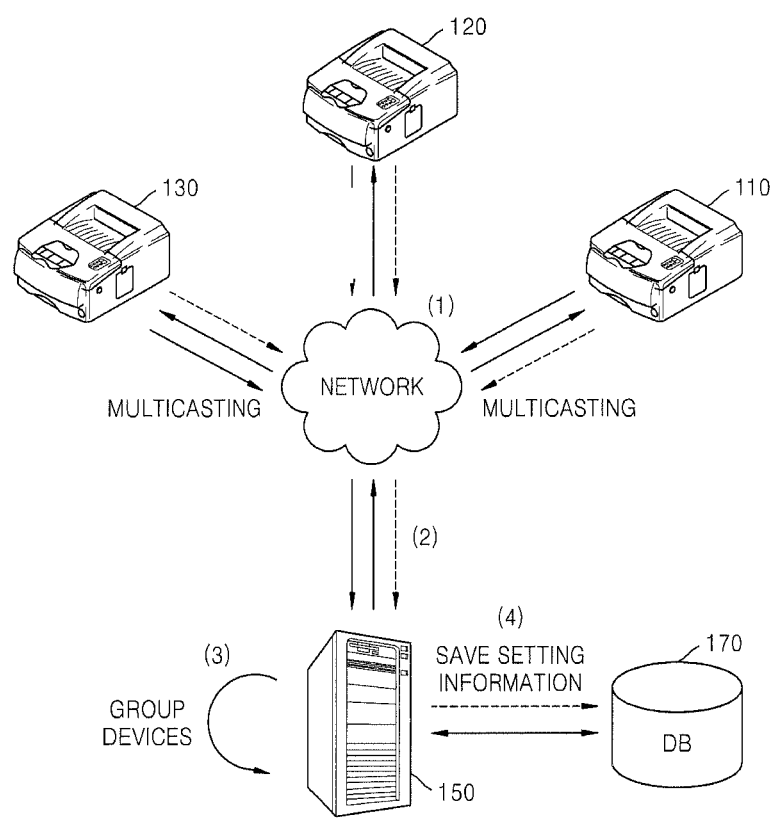
FIG. 1 is a diagram showing an example of a device management operation in a server platform environment.

FIG. 1 is a diagram showing an example of a device management operation in a server platform environment. The device management operation illustrated in FIG. 1 is performed by grouping devices of interest to a user in order to process a device that is in an abnormal or certain status. That is, a device management system checks current statuses of devices based on information regarding the devices obtained by performing multicasting communication, and manages the devices by grouping them based on the current statuses.

The device management operation may be performed as described below. Initially, an agent performs multicasting communication (1), and reads and collects information regarding devices 110, 120, and 130 distributed in a network (2). The agent transmits the collected information to a main server 150.

A user generates a group to be particularly managed from among device list displayed and assigns desired devices to the generated group (sets a group) (3). A device management system saves device management environments set and assigned by the user, in a database 170, and manages the desired devices in a fixed environment based on the device management environments (saves setting information) (4).

In this case, after the information is collected, the agent manages certain devices based on a device list or configuration set by the user. In general, devices to be managed may be devices in an abnormal status and registered on a list, and may be constantly monitored by performing multicasting communication.

According to an embodiment of the present disclosure, in order to separately manage devices not yet defined as but suspected to be error devices, a network device discovery module is scheduled to operate periodically. Also, status information regarding devices of a suspicious group is dynamically updated after obtaining the status information of the device by performing unicasting and multicasting communication.

The user does not generate a suspicious group but a device management system groups suspicious devices into a suspicious group and manages the suspicious devices. If an error of a device in a suspicious group is resolved appropriately to each abnormal situation, the device is immediately eliminated from the suspicious group.

Figure 2:
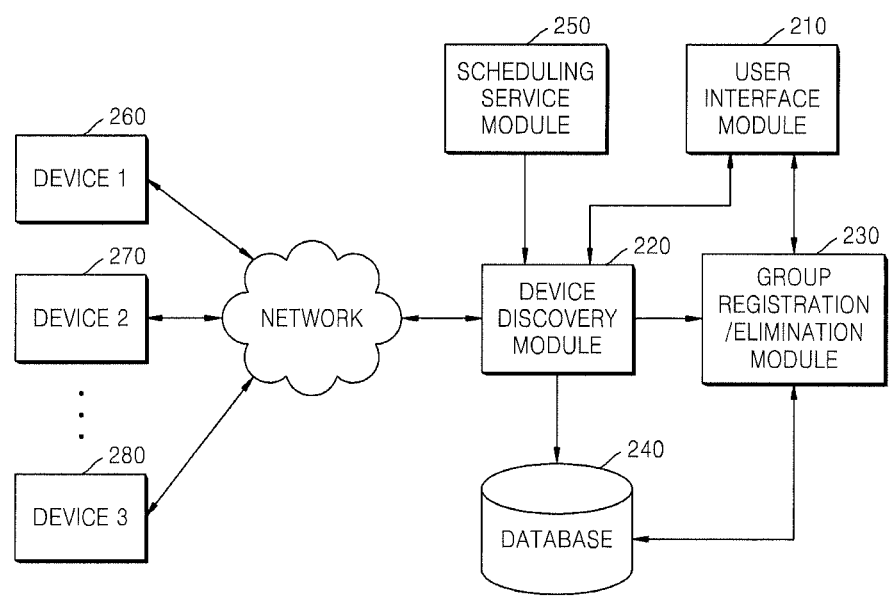
FIG. 2 is a block diagram of a system for managing suspicious devices on a network, according to an embodiment of the present disclosure.

FIG. 2 is a block diagram of a system for managing suspicious devices on a network, according to an embodiment of the present disclosure. The system may include a user interface module 210, a device discovery module 220, and a group registration/elimination module 230, and may further include a database 240 and a scheduling service module 250.

Initially, in the present disclosure, a suspicious device refers to a device to be managed and having a certain abnormal management item from among devices on a network, and a suspicious management item refers to the certain abnormal management item.

The user interface module 210 sets a suspicious group corresponding to each of at least one suspicious management item for managing a plurality of devices 260, 270, and 280 on a network. In the present disclosure, the suspicious management item may include at least one of an invalid serial number, a negative count, wrong collection data, no response, an old version, and a status change. The suspicious group may include subgroups, e.g., an invalid serial number group, a negative count group, a wrong collection data group, a no response group, an old version group, and a status change group.

The invalid serial number group is assigned to devices having an abnormal serial number or having no serial number.

The negative count group is assigned to devices storing a count value less than the count value stored in a server. For example, the negative count group may be managed to prevent a fee-charging problem that occurs when a count value stored in a fee-charging copier is less than the count value stored in a server connected to the fee-charging copier.

The wrong collection data group is assigned to devices that are connected to the network but transmit a wrong value by performing unicasting or multicasting communication. The no response group is assigned to devices that are disconnected from the network for more than a certain period. The certain period may be set by a user.

The old version group is assigned to devices whose firmware installed on the network has a version previous to the version indicated by a property file of the server. The status change group is assigned to devices whose status is frequently changed.

A device may be added to or eliminated from the suspicious group by the user via the user interface module 210.

The device discovery module 220 accesses the devices 260, 270, and 280 on the network and reads information corresponding to the suspicious management item.

The database 240 saves the information read by the device discovery module 220.

The group registration/elimination module 230 determines whether a device is a suspicious device based on the information corresponding to the suspicious management item, registers the device in the suspicious group if the device is determined as a suspicious device, and eliminates the device from the suspicious group if an error of the device is resolved. A list of suspicious devices of the suspicious group may be selectively modified by the user if errors of the devices are resolved.

The scheduling service module 250 schedules the device discovery module 220 to access the devices 260, 270, and 280 on the network and to read the information corresponding to the suspicious management item.

FIG. 3 is a flowchart of a method of managing suspicious devices on a network, according to an embodiment of the present disclosure. Referring to FIG. 3, based on a user's input or selection, the user interface module 210 sets a suspicious group corresponding to each of at least one suspicious management item for managing the devices 260, 270, and 280 on the network (operation S310). The suspicious management item may include at least one of an invalid serial number, a negative count, wrong collection data, no response, an old version, and a status change. As described above, the suspicious group may include subgroups, e.g., an invalid serial number group, a negative count group, a wrong collection data group, a no response group, an old version group, and a status change group. The suspicious management item may be selectively modified by the user.

FIG. 4 is a diagram showing an example of a menu of a suspicious group 400. A suspicious group may include user-desired subgroups. As such, after a user may set a certain condition on item to be managed in a device, the user may generate subgroup corresponding to the certain condition via the user interface module 210. Or the user generates a new subgroup via the user interface module 210, or may set a default subgroup of a system.

Figure 5:
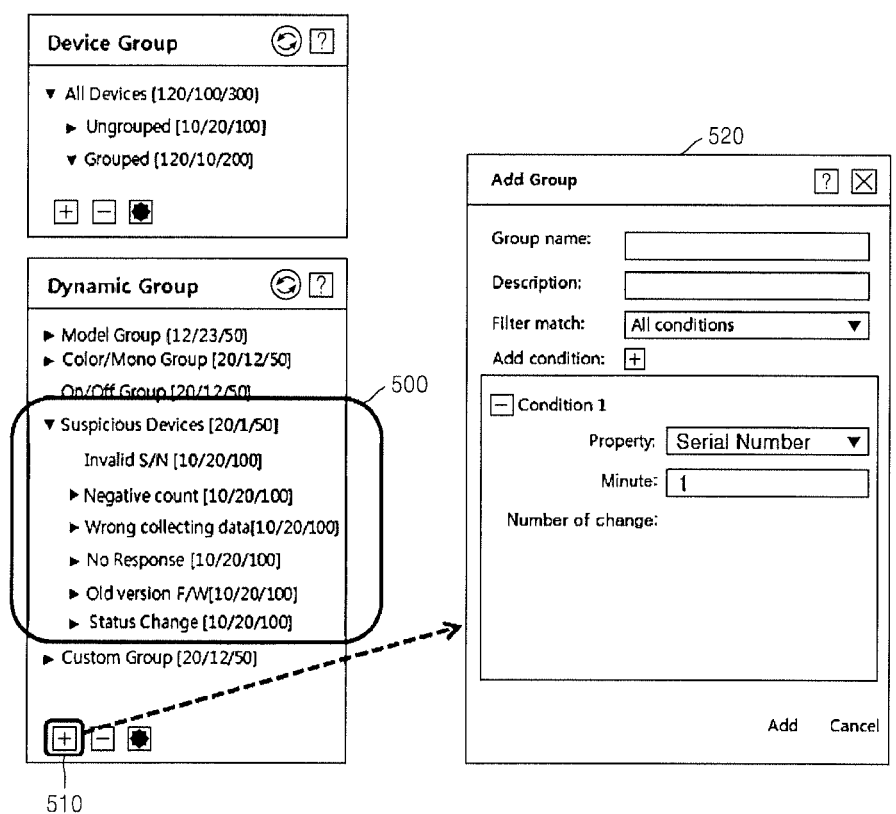
FIG. 5 is a diagram showing subgroups of the suspicious group illustrated in FIG. 4, and a user interface for adding and modifying the subgroups.

FIG. 5 is a diagram showing subgroups 500 of the suspicious group 400 illustrated in FIG. 4, and a user interface 520 for adding and modifying the subgroups 500. Referring to FIG. 5, if the menu of the suspicious group 400 is selected, six subgroups 500, e.g., an invalid serial number group, a negative count group, a wrong collection data group, a no response group, an old version group, and a status change group, are shown.

A device may be added to or deleted from the suspicious group by a user via the user interface module 210. In FIG. 5, a reference numeral 510 represents a menu to be used when adding a menu, and a reference numeral 520 represents a menu for displaying the user interface 520.

Referring back to FIG. 3, after the suspicious group is set, the device discovery module 220 accesses the devices 260, 270, and 280, reads information corresponding to the suspicious management item, and saves the information in the database 240 (operation S320).

The group registration/elimination module 230 determines whether a device is a suspicious device based on the information corresponding to the suspicious management item (operation S330). If the device is determined as a suspicious device, the group registration/elimination module 230 registers the device in the suspicious group (operation S340).

FIG. 6 is a diagram showing a main screen displayed when a user selects an invalid serial number group that is one of subgroups. FIG. 6 shows a list of suspicious devices whose serial numbers are changed. In FIG. 6, an original serial number 600 represents a previous serial number and a current serial number 610 represents a new serial number when the device discovery module 220 re-discovers each device. Referring FIG. 6, the original serial number 600 of each device is changed into the current serial number 610 and thus the user may be aware that the device has an error.

Referring back to FIG. 3, the group registration/elimination module 230 checks whether an error of the device included in the suspicious group is resolved (operation S350). A solution to the error of the device may be suggested and the information corresponding to the suspicious management item may be selectively modified by the user so as to solve the error. Then, the registration/elimination module 230 eliminates the device from the suspicious group (operation S360).

In FIG. 6, if a device manager modifies the current serial number 610 to correspond to the original serial number 600, the device is automatically eliminated from the list of suspicious devices. Or if the user is aware that there is no error in the device and eliminates the device from the list of suspicious devices, the device is not displayed on the list.

However, sometimes, the user may recognize and want to directly modify the error. For example, an interface may be provided to the user interface module 210 to perform a process to resolve the error by the user, and each device having an error to be resolved may be processed via the interface.

FIG. 7 is a diagram showing a main screen displayed when a user recognizes and processes errors of the suspicious devices included in a negative count group. FIG. 7 shows a list of suspicious devices having a count value less than the count value of a server. In FIG. 7, suspicious information 700 represents a negative count.

Sometimes, a user may recognize and want to directly modify an error regarding the negative count. In this case, a request button 710 may be selected and thus a corresponding device is excluded from a billing process until the device has a count value greater than the count value of the server. Also, a progress status 720 may show the user that the count value of the device is increasing and is still less than the count value of the server.

Referring back to FIG. 3, the device of which the error is resolved is managed by using a general method (operation S370).

Meanwhile, if the device is not determined as a suspicious device in operation S330, the device is managed by using the general method (operation S370). Then, the device discovery module 220 may be scheduled to read the information corresponding to the suspicious management item.

FIG. 8 is a flowchart of overall device management on a network, to which the present disclosure is applied. Referring to FIG. 8, information regarding a group of devices on a network is read and collected through multicasting communication (operation 800). The collected information regarding the devices is saved in a database of a server (operation 810). It is determined whether each device is a suspicious device based on the collected information (operation 822). If the device is determined as a suspicious device, the device is assigned to a suspicious group (operation 824). An error of the device included in the suspicious group is resolved by suspicious device management system via a user interface, and then the device of which the error is resolved, is deleted from the suspicious group (operation 826). The device of which the error is resolved, is filtered by using a general method (operation 830), and is assigned to a group (operation 840) or is eliminated from the group (operation 850). Then, the group is managed (operation 860). The present disclosure is applied to operation 820 including operations 822, 824, and 826.

Figure 9:
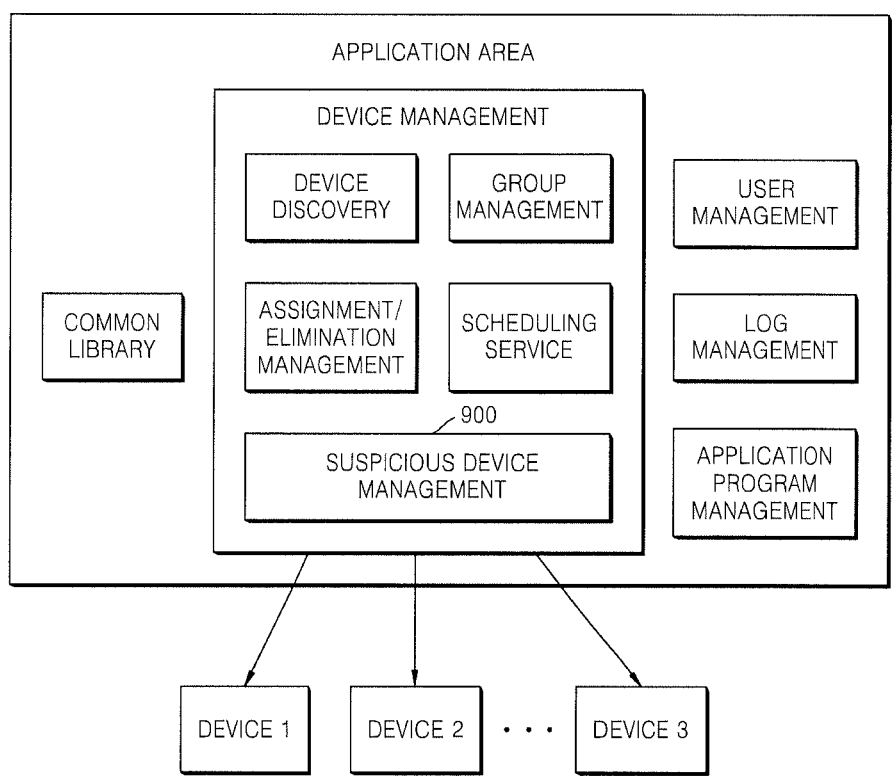
FIG. 9 is a block diagram of device management architecture to which the present disclosure is applied.

FIG. 9 is a block diagram of device management architecture according to an embodiment of the present disclosure. From among a plurality of management modules, the present disclosure is applied to a suspicious device management module 900. The device management architecture includes a device discovery module for initially detecting devices, a group management module for automatically generating groups, an assignment/elimination management module for automatically assigning and eliminating the devices to and from the groups, and a scheduling service module for periodically updating information regarding the devices.

According to the present disclosure, if devices on a network are changed from a normal status into an abnormal status, the devices may be determined as suspicious devices and may be managed by grouping the devices into a suspicious group without a user's intervention. Accordingly, the user may not directly generate a group and directly assign devices to be managed to the group in order to manage the devices.

If an error of a suspicious device is resolved and thus the device returns to a normal status, since a suspicious device management system eliminates the suspicious device from a suspicious group without a user's intervention, the user may not directly recognize an error of the device.

Also, since a suspicious device management system detects and notifies a user about a suspicious device without the user's intervention, that is, since the suspicious device management system manages devices on a network by collecting information regarding the devices, the user may easily manage the devices on the network.

Furthermore, a dynamic device list may be managed. Since devices included in a suspicious group are automatically registered in a list and are automatically eliminated from the list if errors of the devices are resolved, the list of the devices included in the suspicious group may be dynamically managed.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD-ROM disks, DVDs, and Blu-rays; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method comprising:
by at least one processor:
obtaining at least one suspicious management item information indicating a suspicious status of a device on a network, the at least one suspicious management item being an information item from among items of a serial number, a count value, and a firmware version;
setting a suspicious group including at least one suspicious subgroup corresponding to each of the at least one suspicious management item, wherein the at least one suspicious subgroup is generated by a user based on one or more conditions set by the user via a user interface when the at least one suspicious management item is obtained;
accessing a plurality of devices on a network and reading information corresponding to the obtained at least one suspicious management item;
determining whether any of the plurality of devices has a suspicious status based on the read information corresponding to the obtained at least one suspicious management item;
registering the device, from the plurality of devices, in a suspicious subgroup corresponding to a determined suspicious status of the device, wherein the registering includes
registering the device in an invalid serial number subgroup when the read information corresponds to an invalid serial number,
registering the device in a negative count value subgroup when the read information corresponds to a negative count value, and
registering the device in a old version subgroup when the read information corresponds to a previous firmware version;
receiving an input for selecting one of the at least one suspicious subgroup;
updating status information regarding devices of the selected suspicious subgroup in response to obtaining the status information of the devices of the selected suspicious subgroup by performing at least one of unicasting or multicasting communication;
checking whether a device in the selected suspicious subgroup has an error corresponding to a suspicious management item of the selected suspicious subgroup and whether the error is resolved by using the updated status information; and
eliminating the device in the suspicious subgroup if the error is resolved.

2. The method of claim 1, wherein the information item from among items further includes at least one of device response, collection data, and a status.

3. The method of claim 1, wherein the setting of the suspicious subgroups further includes adding or eliminating suspicious subgroups by the user via the user interface.

4. The method of claim 1, wherein the obtaining of the at least one suspicious management item further includes selectively modifying the least one suspicious management item by the user.

5. The method of claim 1, further comprising scheduling the accessing and reading the information corresponding to the obtained at least one suspicious management item.

6. The method of claim 1, wherein the determining whether each of the plurality of devices is suspicious and grouping abnormal devices into the suspicious group is performed without intervention by the user.

7. The method of claim 1, further comprising suggesting to the user a solution to the error based on the checking.

8. The method of claim 1, wherein the user interface is configured to add a device to the suspicious group, and wherein the user interface is configured to eliminate a device from the suspicious group.

9. The method of claim 1, further comprising outputting a status of an error resolution to the user indicating that an error resolution is progressing while the error is not resolved.

10. A system comprising:
at least one hardware processor configured to:
obtain at least one suspicious management item information indicating a suspicious status of a device on a network, and set a suspicious group including at least one suspicious subgroup corresponding to each of the at least one suspicious management item, wherein
the at least one suspicious management item being an information from among the items of a serial number, a count value, and a firmware version, and
the at least one suspicious subgroup is generated by a user based on one or more conditions set by the user via a user interface when the at least one suspicious management item is obtained;
access a plurality of devices on a network and read information corresponding to the obtained at least one suspicious management item;
determine whether any of the plurality of devices has a suspicious status based on the read information corresponding to the obtained at least one suspicious management item;
register the device, from the plurality of devices, in the suspicious subgroup group corresponding to a determined suspicious status of the device, wherein to register the device includes
register the device in an invalid serial number subgroup when the read information corresponds to an invalid serial number,
register the device in a negative count value subgroup when the read information corresponds to a negative count value, and
register the device in an old version subgroup when the read information corresponds to a previous firmware version;
receive an input for selecting one of the at least one suspicious subgroup;
update status information regarding devices of the selected suspicious subgroup in response to obtaining the status information of the devices of the selected suspicious subgroup by performing at least one of unicasting or multicasting communication;
check whether a device in the selected suspicious subgroup has an error corresponding to a suspicious management item of the selected suspicious subgroup and whether the error is resolved by using the updated status information; and
eliminate the device in the suspicious subgroup if the error is resolved.

11. The system of claim 10, wherein the information item from among items further includes at least one of device response, collection data, and a status.

12. The system of claim 10, wherein the at least one hardware processor is further configured to add or eliminate the suspicious subgroups by the user via the user interface.

13. The system of claim 10, wherein the at least one hardware processor is further configured to selectively modify the at least one suspicious management item by the user.

14. The system of claim 10, wherein the at least one hardware processor is further configured to schedule the access and read the information corresponding to the obtained at least one suspicious management item.

15. The system of claim 10, wherein the at least one hardware processor is further configured to determine whether each of the plurality of devices is suspicious and groups abnormal devices into the suspicious group without intervention by the user.

16. The system of claim 10, wherein the at least one hardware processor is further configured to suggest to the user a solution to the error based on the checking of whether the device comprises the error.

17. The system of claim 10, wherein the user interface is configured to add a device to the suspicious group, and wherein the user interface is configured to eliminate a device from the suspicious group.

18. The system of claim 10, wherein the at least one hardware processor is further configured to output a status of an error resolution to the user indicating that an error resolution is progressing while the error is not resolved.

19. At least one non-transitory computer readable medium comprising computer readable instructions that control at least one processor to implement a method, the method comprising:
obtaining at least one suspicious management item information indicating a suspicious status of a device on a network, the at least one suspicious management item being an information item from among items of a serial number, a count value, and a firmware version;
setting a suspicious group including at least one suspicious subgroup corresponding to each of the at least one suspicious management item, wherein the at least one suspicious subgroup is generated by a user based on one or more conditions set by the user via a user interface when the at least one suspicious management item is obtained;
accessing a plurality of devices on a network and reading information corresponding to the obtained at least one suspicious management item;
determining whether any of the plurality of devices has a suspicious status based on the read information corresponding to the obtained at least one suspicious management item;
registering the device, from the plurality of devices, in a suspicious subgroup corresponding to a determined suspicious status of the device, wherein the registering includes
registering the device in an invalid serial number subgroup when the read information corresponds to an invalid serial number,
registering the device in a negative count value subgroup when the read information corresponds to a negative count value, and
registering the device in a old version subgroup when the read information corresponds to a previous firmware version;
receiving an input for selecting one of the at least one suspicious subgroup;
updating status information regarding devices of the selected suspicious subgroup in response to obtaining the status information of the devices of the selected suspicious subgroup by performing at least one of unicasting or multicasting communication;

checking whether a device in the selected suspicious subgroup has an error corresponding to a suspicious management item of the selected suspicious subgroup and whether the error is resolved by using the updated status information; and eliminating the device in the suspicious subgroup if the error is resolved.

* * * * *